United States Patent [19]

Fähnrich et al.

[11] Patent Number: 4,808,887
[45] Date of Patent: Feb. 28, 1989

[54] LOW-PRESSURE DISCHARGE LAMP, PARTICULARLY FLUORESCENT LAMP HIGH-FREQUENCY OPERATING SYSTEM WITH LOW INDUCTANCE POWER NETWORK CIRCUIT

[75] Inventors: Hans-Jürgen Fähnrich, Munich; Anton Zuchtriegel, Taufkirchen, both of Fed. Rep. of Germany

[73] Assignee: Patent-Treuhand-Gesellschaft fur elektrische Gluhlampen m.b.H., Munich, Fed. Rep. of Germany

[21] Appl. No.: 69,857

[22] Filed: Jul. 6, 1987

[30] Foreign Application Priority Data

Jul. 14, 1986 [DE] Fed. Rep. of Germany ....... 3623749

[51] Int. Cl.⁴ .................. H05B 41/29; H02M 1/12; H02M 7/538
[52] U.S. Cl. .................... 315/247; 315/224; 315/244; 315/DIG. 5; 363/39; 363/48; 363/40
[58] Field of Search ............... 315/209 T, 209 R, 208, 315/224, 223, 244, DIG. 5, DIG. 7, 226, 239, 214, 210, 287, 247, 219; 363/132, 78, 97, 39, 40, 47, 48

[56] References Cited

U.S. PATENT DOCUMENTS

| | | | |
|---|---|---|---|
| 4,277,726 | 7/1981 | Burke | 315/DIG. 5 |
| 4,388,562 | 6/1983 | Josephson | 315/DIG. 5 |
| 4,398,126 | 8/1983 | Zuchtriegel | 315/244 |
| 4,438,371 | 3/1984 | Zuchtriegel | 315/224 |
| 4,438,372 | 3/1984 | Zuchtriegel | 315/244 |
| 4,481,460 | 11/1984 | Kröning et al. | 323/266 |
| 4,511,823 | 4/1985 | Eaton et al. | 315/208 |
| 4,553,070 | 11/1985 | Sairanen et al. | 315/209 R |
| 4,562,527 | 12/1985 | Klamt | 315/DIG. 7 |
| 4,572,989 | 2/1986 | Zuchtriegel | 315/209 R |
| 4,684,851 | 8/1987 | Van Meurs | 315/DIG. 7 |
| 4,710,682 | 12/1987 | Zuchtriegel | 315/224 |

OTHER PUBLICATIONS

Sipmos Transistors, Siemens Application Notes 1983, Chapter 1.9 "Electronic Ballast for Fluorescent Lamps" pp. 34 et seq.
Elektronik-Schaltungen (Electronic Circuits) by Waltr Hirschmann Publish by Siemens AG, Chapter B3.12.

Primary Examiner—David K. Moore
Assistant Examiner—Mark R. Powell
Attorney, Agent, or Firm—Frishauf, Holtz, Goodman & Woodward

[57] ABSTRACT

To reduce network harmonics upon connecting a fluorescent lamp (LP1) with a power network rectifier (2) and a push-pull frequency generator (3) and a series resonance circuit (4) to the network, a harmonic filter is connected in the circuit with the fluorescent lamp (LP1) or lamps (LP1, LP2). The harmonic filter includes two diodes (D8, D9), connected in forward current passing direction to the power rectifier (2), and two capacitors (C7, C8) connected, respectively, between the serially connected diodes and a center tap (M1) between the push-pull transistors directly and beyond an inductance forming part of a series resonance circuit (4) for the lamps. In parallel to the two diodes, two further diodes (D10, D11) are provided, having a center tap (M4) which is connected over a capacitor (C9) also to the center tap between the transistors of the push-pull frequency generator (3). Preferably, the capacity value of the further capacitor (C9) is about 0.2 times the total capacity value in the harmonic filter circuit.

5 Claims, 4 Drawing Sheets

LOW-PRESSURE DISCHARGE LAMP, PARTICULARLY FLUORESCENT LAMP HIGH-FREQUENCY OPERATING SYSTEM WITH LOW INDUCTANCE POWER NETWORK CIRCUIT

REFERENCE TO RELATED LITERATURES

U.S. Pat. No. 4,438,372, Zuchtriegel, assigned to the assignee of the present application, the disclosure of which is hereby incorporated by reference.

U.S. Pat. No. 4,481,460, Kröning et al, the disclosure of which is hereby incorporated by reference. "SIPMOS Transistors", SIEMENS Application Notes 1983, chapter 1.9, "Electronic ballast for fluorescent lamps", pp. 34 et seq.

and equivalent general disclosure "Elektronikschaltungen" ("Electronic Circuits") by Walter Hirschmann, published by SIEMENS AG, chapter B3.12, "Elektronisches Vorschaltgerät fur neue Leuchtstofflampen" ("Electronic Ballast for New Fluorescent Lamps") 50 W/220 v, a-c, pp. 147 to 151, especially page 148.

U.S. Ser. No. 023,456, filed Mar. 9, 1987, Zuchtriegel, now U.S. Pat. No. 4,710,682.

U.S. Ser. No. 023,481, filed Mar. 9, 1987, now U.S. Pat. No. 4,710,682, Fahnrich et al, both the patents assigned to the assignee of the present application.

U.S. Ser. No. 048,005, now U.S. Pat. No. 4,775,822, filed May 8, 1987, Statnic et al (claiming priority German Appl. No. P 36 15 605.1 of May 9, 1986) assigned to the assignee of the present application.

The present invention relates to an operating system for low-pressure discharge lamps, particularly fluorescent lamps, from alternating power networks, and especially to such systems with low-inductance input units, so as to reduce the requirement for bulky components, without, however, interfering with wave-shape requirements of standardized power systems.

BACKGROUND

The referenced literature and patent disclosures are directed to fluorescent lamp systems in which fluorescent lamps are operated at a frequency high with respect to power network frequency, for example in the 10–100 kHz range. Such a system, for example, may include a fluorescent lamp operating circuit adapted to be connected to a power line circuit, operating at power line voltage and frequency, typically 110 V, 60 Hz, or 220 V, 50 Hz. The lamp circuit defines a positive and negative input terminal, across which an input capacitor is connected. A push-pull transistor frequency generator provides high-frequency power to the lamp or a plurality of lamps. The frequency generator typically includes two alternately conducting transistors, connected to a common junction. A current transformer has first and second windings connected, respectively, to the bases of the respective transistors to provide, in combination with another winding, an oscillatory circuit. Each one of the fluorescent lamps has an associated series resonance circuit which includes a resonance inductance and a coupling capacitor as well as a resonance capacitor connected to the filaments of the lamps. The referenced earlier application Ser. No. 023,481, filed Mar. 9, 1987, Fahnrich et al, assigned to the assignee of the present application and the disclosure of which is hereby incorporated by reference, describes an arrangement to insure that the wave shape or network power connected to the lamp circuit is not distorted beyond tolerance limits. This arrangement includes two diodes which are serially connected in forward current passing direction, defining a diode junction therebetween. The serially connected diodes have one end terminal connected to a terminal of the input capacitor and another end terminal connected to the network side of one electrode of the lamp. A capacitor connects the diode junction to the common junction of the push-pull connected transistors. The circuit also utilizes a power line choke connected between the network power supply terminals and the lamp circuit input terminals.

The system works well; it is versatile and can be used with single fluorescent lamps or a plurality of fluorescent lamps located, for example, in a single fixture. The fluorescent lamps can be serially connected. In one arrangement, the first electrode of a first lamp is connected over the resonance inductance with the center tap between the two transistors, and the second electrode of the last lamp in the series is connected with either the positive or the negative terminal of the network rectifier. The referenced application Ser. No. 023,481, filed Mar. 9, 1987, describes such an arrangement in detail. This arrangement includes an iron core choke in the network power frequency portion of the circuit, in order to smooth out any remaining peaks due to capacitor charging, and which might be fed back into the network, in order to provide a circuit which will not distort the wave shape and to meet all standardization and power network requirement with respect to wave shape and feedback characteristics of connected appliances or units.

The iron core choke requires substantial space; its dimensions are substantially larger than all other components of the circuit which can be constructed in miniaturized form. The arrangement, thus, because of the presence of the iron core choke, cannot easily be fitted within, for example, the base of a fluorescent lamp; the choke would be external to the base so that the entire connection system to connect a lamp and the associated circuitry to a power terminal plug cannot be integrated in the base or within a base-socket combination of a fluorescent lamp.

THE INVENTION

It is an object to so improve an operating circuit for a fluorescent lamp, and more particularly an operating circuit which is basically described in the referenced application Ser. No. 023,481, filed Mar. 9, 1987, Fahnrich et al, which does not require an iron choke of substantial size or, preferably, does not require an input iron core choke at all. The circuit should be so arranged that all components can be miniaturized while, still, maintaining the requisite wave shape to meet power supply standards and requirements.

Briefly, a harmonic or peak wave-shaping filter containing two further diodes is provided, connected in parallel to the series circuit of the two diodes, which are polarized in forward current direction. These two further diodes are likewise polarized in the same direction and define, between them, a center tap which is coupled over a capacitor with the center tap between the two transistors of the push-pull frequency generator.

The additional circuit components, then, provide for a double pumping system which continuously supplies energy to the smoothing capacitor so that a sinusoidal current wave will be accepted by the overall network and insure a linear relationship between network voltage and lamp power.

In accordance with a feature of the invention, the capacity values, in nanoFarads (nF) of the capacitors in the harmonic filter may not exceed a maximum value defined by the relationship:

$$C_{Res} = (P_{Ges} \cdot \sqrt{2} \cdot 10^9)/(U_N^2 \cdot f_B) \qquad (1)$$

wherein $P_{Ges}$ is the total power consumed by the lamp or lamps and the circuit components, in W; $U_N$ the nominal network supply voltage of the system in volts; $f_B$ the lamp operating frequency in Hertz; and $C_{Res}$ the capacity of the capacitors of the harmonic filter.

The so-computed capacity values define an optimum maximum value; if it is exceeded, switching losses occur since the energy stored in the capacitors during pause times of the switching transistors cannot entirely flow to the smoothing capacitor. Upon substantial exceeding of this maximum value, the transistors may be subjected to short-circuit currents which substantially increases their loading, and may cause damage or destruction of the transistors.

In accordance with a preferred feature of the invention, the capacitor which connects the center tap between the two additional diodes with the center tap between the two transistors of the push-pull circuit should have a capacity which is about 0.1 to 0.4 times the sum of the capacity values of the capacitors of the harmonic filter. This relationship is highly desirable due to the square-law change of energy in the course of the sinusoidal network voltage half-wave. If the capacity becomes too large, a substantial and strong third harmonic in the harmonics will appear. Additionally, the lamp power will become more dependent on network voltage. A particularly desirable capacity value for the capacitor is about 0.2 times the entire capacitor of all the capacitors forming the harmonic filter, in other words, about 20%.

DRAWINGS

DETAILED DESCRIPTION

Figure 1:
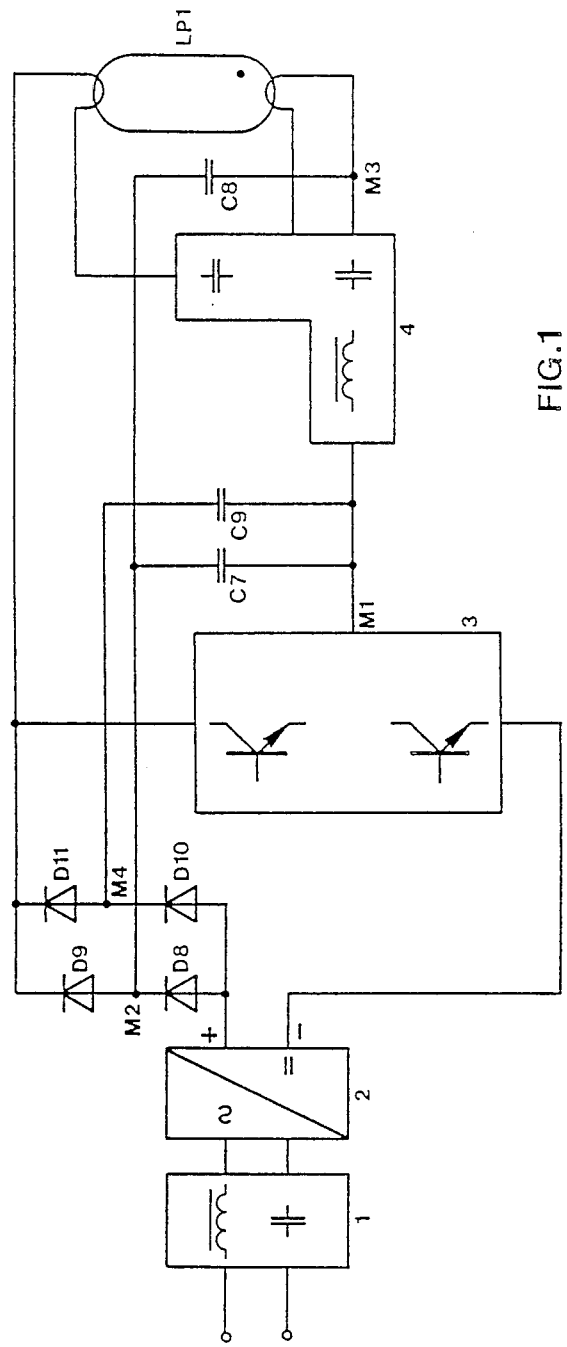
FIG. 1 is a highly schematic block circuit diagram of the system and circuit with harmonic suppression filter for use with a single fluorescent lamp.

Referring first to FIG. 1: The circuit has a high-frequency filter 1, a network rectifier 2, a push-pull transistor frequency generator 3, including a control circuit for the transistors. The serially connected transistors, which are switching transistors, are connected across the d-c output P1, P2 of the rectifier 2. The center or common connection M1 of the switching transistors is connected through a series resonance circuit 4 to the fluorescent lamp LP1. The electrode remote from the connection to the terminal M1 is connected to the positive terminal of the rectifier 2. Network power is applied at terminals U.

The harmonic frequency filter includes the series connection of two diodes D8 and D9 which are connected in d-c forward current polarity between the positive terminal of the network rectifier 2 and the corresponding electrode of the fluorescent lamp LP1. The center tap or common junction M2 between the two diodes D8, D9 is connected via a capacitor C7 with the center terminal M1 between the serially connected transistors of the push-pull frequency generator 3. A capacitor C8 is additionally connected with the center or common terminal M2 and a terminal M3 between the series resonance circuit 4 and the electrode of the fluorescent lamp LP1.

In accordance with the invention, two further diodes D10, D11 are connected in forward current carrying polarity in parallel to the two diodes D8, D9. The common center terminal or junction M4 between the diodes D10, D11 is coupled over a capacitor C9 with the center terminal M1 between the two transistors of the push-pull frequency generator 3.

Figure 2:
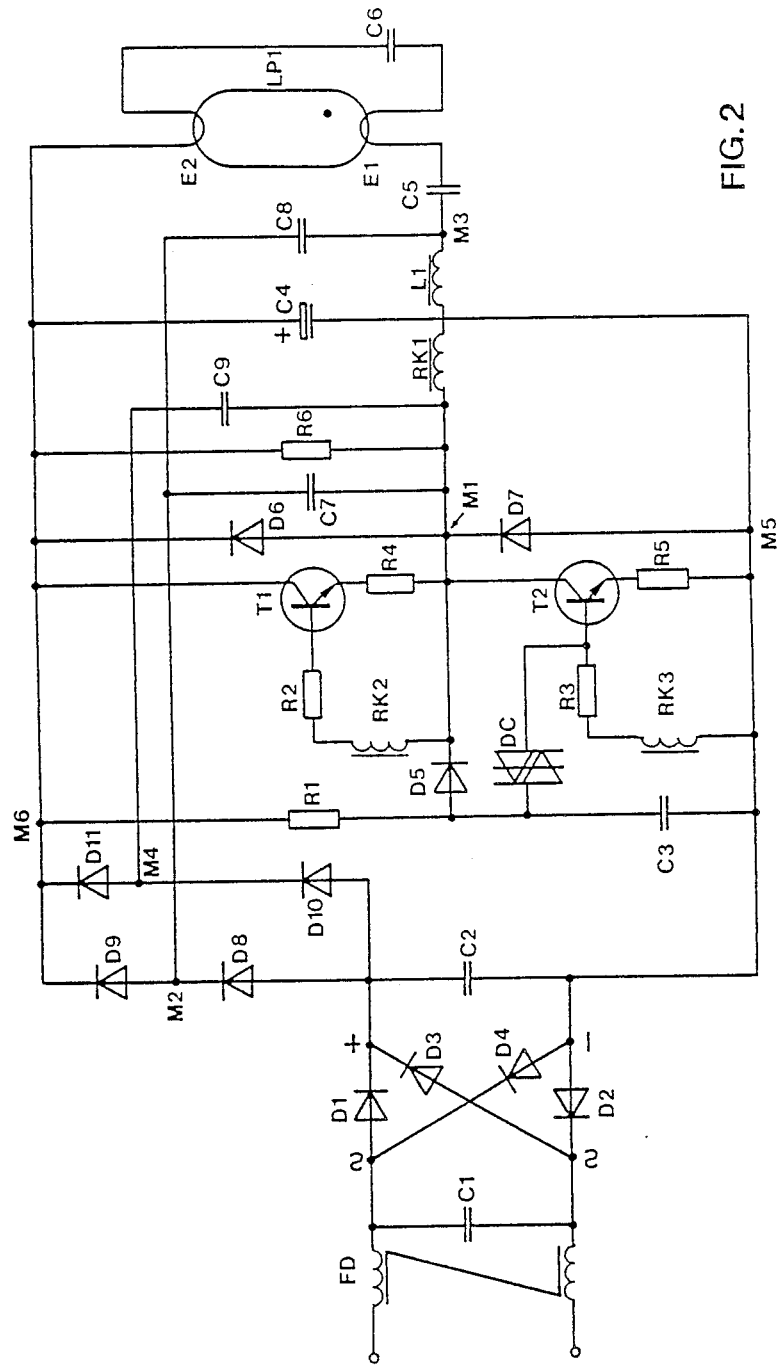
FIG. 2 is a detailed circuit diagram of the system of FIG. 1.

FIG. 2 illustrates the detailed circuit, incorporating the harmonic filter in accordance with the present invention, and connected to a single frequency lamp.

A current compensated filter choke FD is connected directly to the power input in each one of the connecting lines from power terminal U at which, for example, 110 V, 60 Hz is applied. A filter capacitor C1 is connected across the power terminals, behind the windings of the current compensated filter choke FD. The combination of the filter choke and the capacitor C1 form a high-frequency filter. Connected directly to the high-frequency filter is a network rectifier having diodes D1 to D4. The d-c output of the diode rectifier is bridged by an input capacitor C2, connected across lamp circuit input terminals P1 and P2.

The push-pull frequency generator is self-controlling and formed by the two switching transistors T1, T2, shunted by free-wheeling diodes D6, D7. The transistors T1, T2 are coupled to resistance networks R2, R3, R4, R5, are connected to a starting capacitor C3, a diode D5, a diac DC, and have their bases connected to windings RK2, RK3, forming part of an inductive oscillating transformer. Additional resistors R1, R6 are connected in circuit with the transistors to provide for start voltages.

The inductive portion of the circuit operates on the well-known feedback principle and includes the primary winding RK1 as well as the secondary windings RK2, RK3, with the primary winding being connected to the center terminal M1 between the transistors T1, T2. The lamp LP1 has one terminal of electrode E1 connected through capacitor C5 and an inductance L1 and the primary winding RK1 to the center tap or terminal M1 between the transistors T1, T2. One terminal of the other electrode E2 is connected with the positive terminal of the network rectifier. The inductance L1, forming a resonance inductance of the series resonance circuit which includes the coupling capacitor C5 and a resonance capacitor C6, is serially connected with the electrodes of the fluorescent lamp LP1. The resonance inductance L1 and the coupling capacitor C5 are connected between the primary winding RK1 of the oscillating transformer and the respective terminal of the electrode E1. The resonance capacitor C6 is connected between the terminals of the electrodes E1, E2 of the lamp LP1 which are remote from the terminals connected to the connection M1 between the transistors T1, T2 and the positive terminal of the rectifier. A smoothing capacitor C4 is additionally connected in parallel to the switching path of the transistors T1, T2.

The operation of the circuit is well known; it is described, for example, in the literature reference "Electronikschaltungen" ("Electronic Circuits") by Walter Hirschmann, published by SIEMENS AG, page 148 and, further, described in detail in the referenced patents. A further explanation, therefore, is not here necessary.

The circuit further includes a harmonic filter which is formed by two serially connected diodes D8, D9, polarized in current-carrying connection, and connected to the input capacitor C2. The center connection or junction M2 between the diodes D8, D9 is connected through capacitor C7 with the center connection M1 between the transistors T1, T2 and, further, through a capacitor C8 with the terminal or junction M3 between the resonance inductance L1 and the coupling capacitor C5.

In accordance with the invention, the harmonic filter additionally includes two diodes D10, D11, connected to be polarized in current-carrying direction, and connected in parallel to the first two diodes D8, D9. The center junction M4 between the two diodes D10, D11 is connected through a capacitor C9 to the center tap M1 between the transistors T1, T2.

OPERATION OF THE HARMONIC FILTERS

For best understanding, the operation of the harmonic filter will be described in connection with the operation of the push-pull frequency generator. Losses and voltage drops in the respective components are small in relation to network voltage and can be neglected; for this reason, they have not been considered in the following discussion.

Step 1: Transistor T2 becomes conductive and pulls the voltage of the junction M1 to the voltage of the junction M5. Thus, the junction M1 will have the voltage at the negative terminal of the smoothing capacitor C4. The pumping capacitors C7, C8, C9 are charged in accordance with the voltage difference of (1) instantaneous value of the voltage on capacitor C2, and (2) voltage at point M5, at the peak of the network voltage, to a value $U_N \cdot \sqrt{2}$, wherein $U_N$ corresponds to the voltage at terminals U—less, of course, such voltage drops as occur in the filter FD and the diodes D1-D4 which, as noted, can be neglected.

Step 2: Transistor T2 blocks. The voltages at the points M1, M3 rise rapidly, in jump form, and pull up the voltages of the capacitors C7, C8, C9. The capacitors C7, C8, C9 receive a higher voltage than that of the smoothing capacitor C4 and thus can discharge into the capacitor C4.

Step 3: Transistor T1 becomes conductive and raises the voltage at the junction M1 to the voltage at the junction M6, which corresponds to the voltage of the positive terminal of the smoothing capacitor C4. The resonance inductance L1 recharges in opposite direction.

Step 4: Transducer T1 blocks, and thus causes the resonance inductance L1 to discharge in the capacitors C7, C9 and thus also into capacitor C8. The pumping capacitors C7, C8, C9 thus are charged also when the network voltage passes through the zero or null range, since the voltage of the pumping capacitors C7, C8, C9, in that range, are negative with respect to the instantaneous value of the capacitor C2.

Thereafter, the next step will be identical to Step 1, above described, and the energy transport starts anew. For each period at the high-frequency operating frequency, energy is first pumped into the smoothing capacitor C4. In the region of the peak value of the network voltage, capacitors C7, C8, C9 are charged to the peak value of the network voltage. Thereafter, the voltage and the energy drop. The smoothing capacitor C4 will have energy pumped therein during the network half-wave which corresponds to the instantaneous value of the pulsing d-c voltage at the rectifier capacitor C2, decreased by the energy stored in the resonance inductance L1.

In the region of the network zero cross-over, the voltage difference due to network voltages between point or junction M5 and the positive terminal of the network rectifier is zero or null; yet, a voltage difference occurs, since the energy stored in the resonance inductance L1 is pumped back in this region via capacitors C7 and C8 into the smoothing capacitor C4.

The largest contribution, with respect to sinusoidal current being supplied, is formed by the capacitors of the harmonic filter, which are connected to the center tap M1 between the transistors T1, T2. Capacitor C8, due to its series connection with inductance L1, is a resonance capacitor. Likewise, capacitor C6, due to its serial connection with the inductance L1, is a resonance capacitor. The capacitor C7 is connected in parallel to the capacitor C8. Thus, it changes the capacitance of the resonance circuit formed by inductance L1 and C8 to provide a new combined resonance, $C_{com} = C7 + C8$. This increased capacitance loads the resonant circuit.

It is desirable to make the capacitance of the capacities of the harmonic filter connected to the center tap M1 as large as possible, without, however, simultaneously loading the resonant circuit of the overall network. Thus, and to eliminate this loading, while increasing the capacity value, the second capacitor C9 is separated by the parallel diodes D10, D11 from the resonant circuit formed by capacitors C7 and C8 and inductance L1.

Figure 4A:
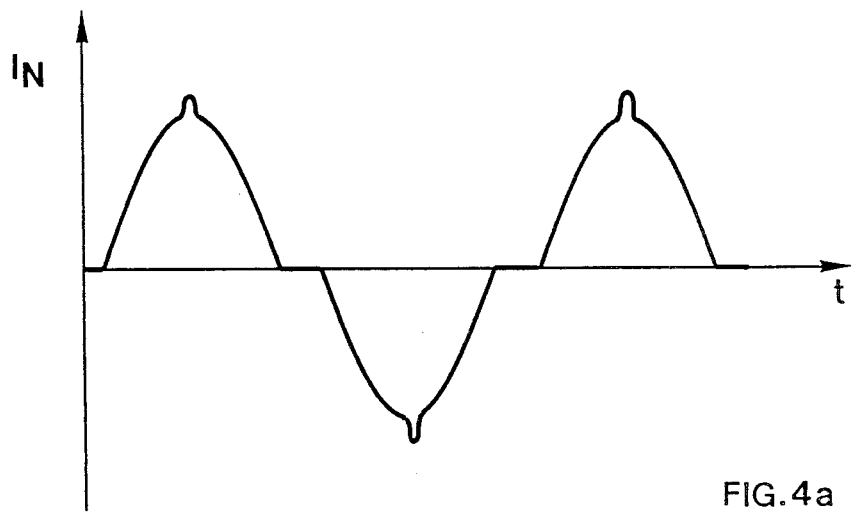
FIG. 4a is a diagram, with respect to time, of input current supplied from a power network without the present invention.
Figure 4B:
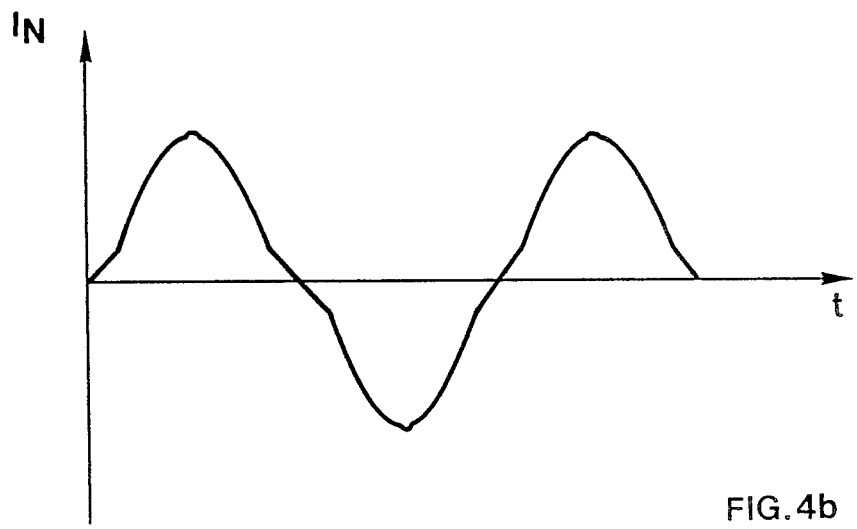
FIG. 4b is the same current with the present invention.

The improvement can readily be seen by comparing FIGS. 4a and 4b, in which the FIG. 4a shows the current without the diodes D10, D11 and the capacitor C9, whereas the FIG. 4b shows the same current with the circuit in accordance with the present invention, that is, including the diodes D10, D11 and capacitor C9.

The choke FD is a current compensated choke without an air gap. In this context, current "current compensated" means that the ferrite core of the coil has two identical windings which are so connected that the magnetic field generated by one winding is exactly compensated and cancelled by that of the other. The inductance L1 is not a current compensated inductance or choke, and includes a core and an air gap. The filter circuit formed by the choke FD and capacitor C1 is used to suppress high frequency noise voltages which are caused by the high frequency generator circuit, that is, frequencies of about 10 kHz and higher.

The present invention provides a solution to the problem of input current distortion utilizing small size elements which can be placed on a semi-conductor chip. A similar solution, utilizing, however, an additional inductance is illustrated in U.S. application Ser. No. 023,481, filed Mar. 9, 1987, Fahnrich et al, assigned to the assignee of the present application. The additional inductance, in combination with capacitors connected similar to capacitors C7, C8 herein, although of different values, provide for suppression of odd harmonics, particularly the third to thirteenth harmonic, and thereby insuring essentially sinusoidal current supply. The diodecapacitive system as illustrated in the Figures of this application likewise provides for suppression of these harmonics and an essentially sinusoidal network current.

In an operating example, a 36 W fluorescent lamp circuit designed for operation at 220 V, 50 Hz, had the following components:

FD: EF25, 50 mH
C1: 68 nF, 250 V~
D1-D4: rectifier bridge circuit B250, C800
C2: 68 nF, 250 V~
R1, R6: 510 kΩ
C3: 47 nF, 250 V—
D5: 1N4005
DC: N413M
R2, R3: 8, 2 Ω
T1, T2: MJE13007
R4, R5: 0,68Ω
D6-D11: RGP10J
C6, C7, C8: 10 nF, 400 V~
RK1: 5 windings (13×7×5)
RK2, RK3: 1 winding
C4: 10 μF, 450 V⎓
L1: EF25, 0,9 mH
C5: 150 nF, 400 V—
C9: 3,3 nF, 400 V~.

A circuit with the above elements will have a waveshape of the network current, and a network harmonic content which is well within the standards of the International Electrical Commission (IEC) and, of course, also well within power company required standards, for example the standards determined by the Society of German Electrical Engineers (VDE). The power factor is in excess of 0.99.

Figure 3:
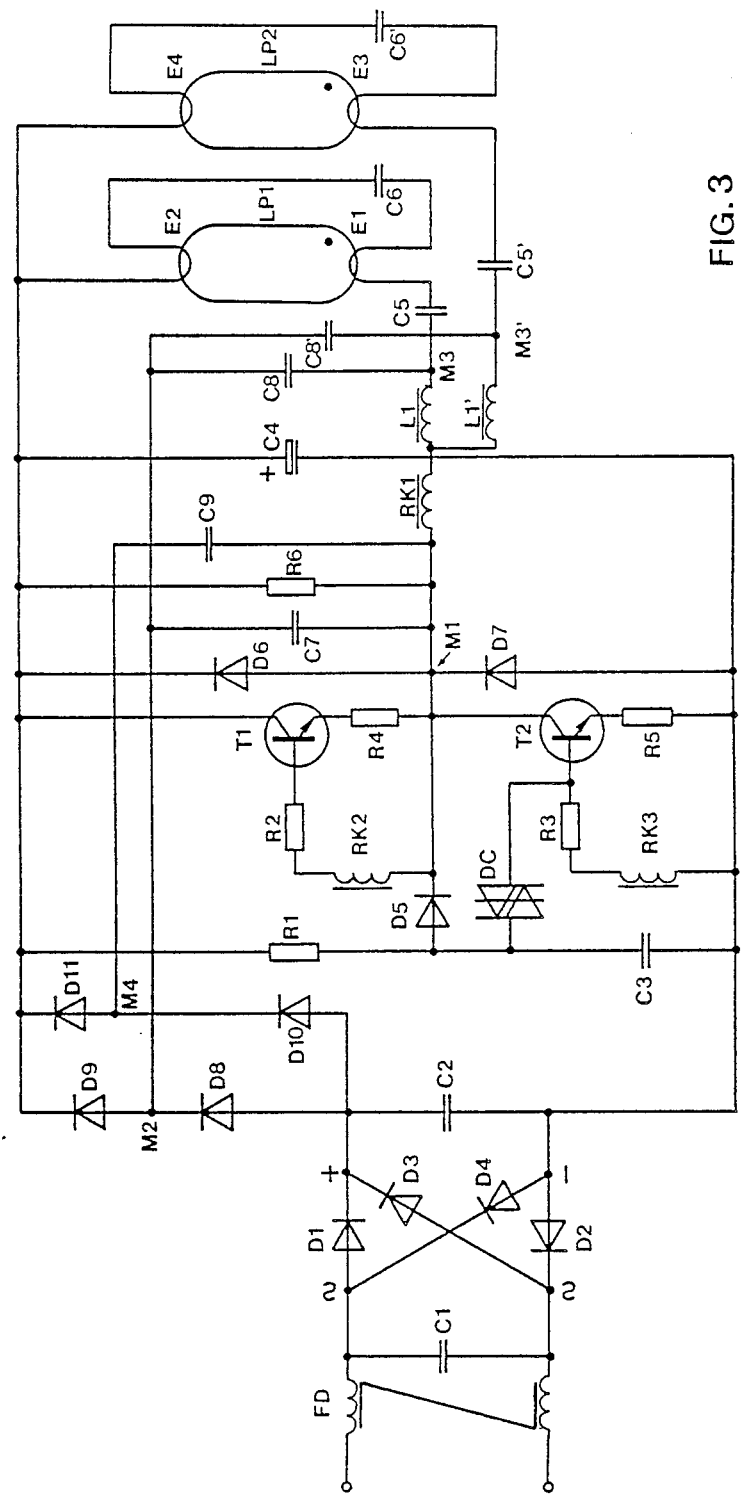
FIG. 3 is a detailed circuit diagram illustrating the system connected for use with two fluorescent lamps, connected in parallel.

FIG. 3 shows the circuit diagram of a system in accordance with the present invention used with two fluorescent lamps; of course, more than two fluorescent lamps can be connected in parallel, similar to the circuit shown in FIG. 3. Essentially, the circuit is identical to that shown in FIG. 2, and similar elements have been given the same reference numerals and will not be explained again.

In addition to the lamp LP1 (FIG. 2), a further lamp LP2 with electrodes E3, E4 is provided. Additionally, parallel to the first series resonance circuit, a second series resonance circuit formed by resonance inductance L1′, coupling capacitor C5′, and resonance capacitance C6′ are provided. The center terminal M2 between the first two diodes D8, D9 is connected additionally to the center terminal M3′ via capacitor C8′, that is, between the resonance inductance L1′ and coupling capacitor C5′, of the second resonance circuit.

We claim:

1. In combination with a fluorescent lamp (LP1, LP2),
   a low inductance power network circuit, adapted to be connected to a power line circuit (U) at power line voltage and frequency, including
   a power rectifier (2) having output terminals (P1, P2) which form positive (P1) and negative (P2) lamp circuit input terminals, respectively;
   an input capacitor (C2) connected across said lamp circuit input terminals (P1, P2);
   a push-pull transistor frequency generator (3) having two alternately conducting transistors (T1, T2) and having a common junction (M1);
   and an operating circuit for the transistors, including said lamp, an oscillator transformer (RK), including first (RK1), second (RK2) and third (RK3) windings, the second and third windings being, respectively, connected to the base of a respective transistor (T1, T2) and the first winding being connected between said common junction (M1) and a first electrode (E1, E3) of the lamp electrodes, and
   a series resonance circuit (4) having a series inductance (L1, L1′) defining two terminals and having a first terminal connected to the common junction (M1) of the transistors (T1, T2) and a second terminal (M3, M3′) connected through a series coupling capacitor (C5, C5′) and through lamp filaments of the lamp electrodes (E1, E2, E3, E4) to a resonance capacitor (C6, C6′) in the preheating circuit of the lamp (LP1, LP2),
   and comprising a harmonic filter including
   a first and a second diode (D8, D9), serially connected in forward current passing direction and defining a first diode junction (M2) between said first and second diodes;
   a first coupling capacitor (C7) coupling said first diode junction to said common junction (M1) between said transistors (T1, T2);
   a second coupling capacitor (C8, C8′) coupling said first diode junction (M2) to said second terminal (M3, M3′) of the series inductance (L1, L1′);
   third and fourth diodes (D10, D11), serially connected in forward current passing direction and defining a second diode junction (M4) between said third and fourth diodes, said third and fourth diodes being connected in parallel to said first and second diodes (D8, D9);
   a third coupling capacitor (C9) coupling said second diode junction (M4) to the common junction (M1) between said transistors (T1, T2) of said push-pull transistor frequency generator (3); and
   wherein said first and second serially connected diodes, and said third and fourth serially connected diodes (D8, D9; D10, D11) are connected between one (P1) of said lamp circuit input terminals (P1, P2) and a second electrode (E2, E4) of the lamp electrodes.

2. The combination of claim 1, wherein the sum of the capacity values, in nanoFarads (nF) of the first, second and third coupling capacitors (C7, C8, C8′, C9) of the harmonic filter is defined, at most, by the relationship:

$$C_{Res} = (P_{Ges} \cdot \sqrt{2} \cdot 10^9)/(U_N^2 \cdot f_B)$$

wherein $P_{Ges}$ is the total power consumed by the lamp or lamps and the circuit components, in W; $U_N$ the nominal network supply voltage of the system in volts; $f_B$ the lamp operating frequency in Hertz; and $C_{Res}$ the capacity of the capacitors of the harmonic filter.

3. The combination of claim 1, wherein the third coupling capacitor (C9) has a capacity value which is between 0.1 to 0.4 times the sum of the capacity values of all the capacitors (C7, C8, C8′, C9) of the harmonic filter.

4. The combination of claim 3, wherein said capacity value of the third coupling capacitor is about 0.2 times the sum of said capacity values of all the capacitors in the harmonic filter.

5. The combination of claim 1, wherein the transistors (T1, T2) are serially connected and said common junction (M1) is in the main switching paths of said transistors;

a smoothing capacitor (C4) connected in shunt across said serially connected main switching paths of said serially connected transistors (T1, T2);

wherein the capacity value of the first, second and third coupling capacitors (C7, C8, C8', C9) of said harmonic filter is so matched to the capacity value of the smoothing capacitor (C4) that all energy stored in the coupling capacitors can flow to the smoothing capacitor (C4) within the pause or blocked interval occurring upon switching of said transistors while operating as said push-pull transistor frequency generator.

* * * * *